Oct. 9, 1962    D'ARLE L. McGOUGH    3,057,768
METHOD OF FORMING AN AIR SPRING OF RUBBERIZED FABRIC PLIES
Filed Jan. 7, 1957
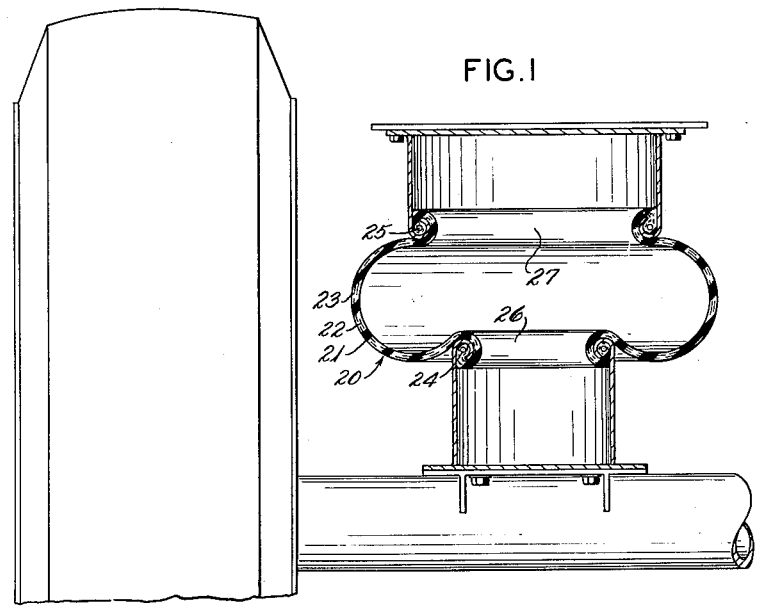
FIG. 1
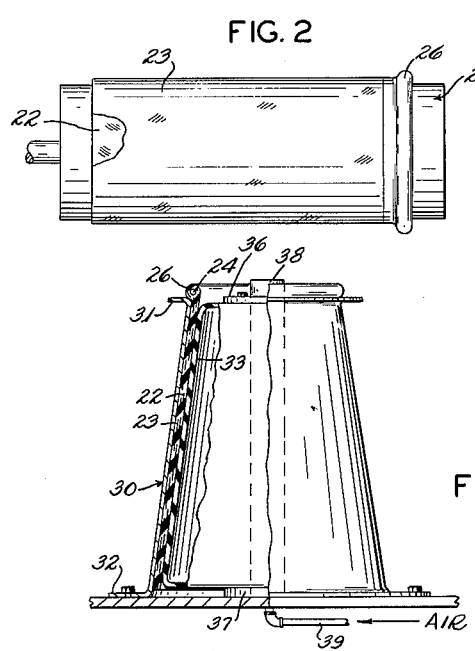
FIG. 2
FIG. 4
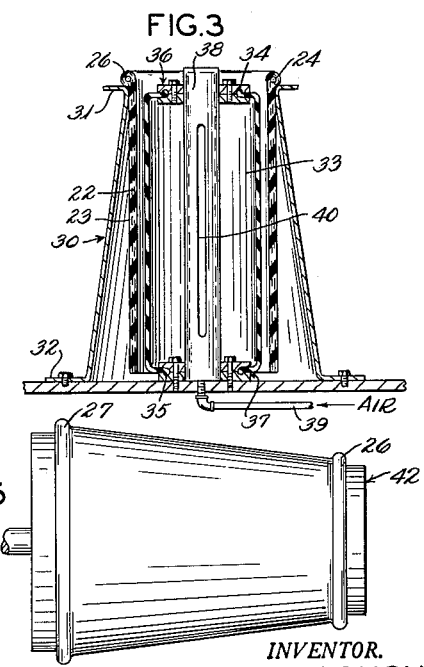
FIG. 3
FIG. 5
INVENTOR.
D'ARLE L. MC GOUGH
BY
W. A. Fraser
ATTY.

3,057,768
METHOD OF FORMING AN AIR SPRING OF RUBBERIZED FABRIC PLIES
D'Arle L. McGough, Noblesville, Ind., assignor to The Firestone Tire & Rubber Company, Akron, Ohio, a corporation of Ohio
Filed Jan. 7, 1957, Ser. No. 632,899
1 Claim. (Cl. 156—202)

This invention relates to air springs and more particularly to a method and an apparatus for manufacturing air springs.

The invention is especially directed to the manufacture of an air spring having a single convolution body terminating in beads of different diameters so that it compresses in a telescoping manner when it is used in an automobile wheel suspension or other environment. Such an air spring is usually made of rubberized fabric plies the ends of which are wrapped about and anchored to inextensible rings which form the beads of the air spring. A preferred method of manufacturing such an air spring comprises assembling the fabric plies to form a cylindrical body and then expanding the plies outwardly at one end so that the edge portion of the plies can be wrapped around a bead ring to form the large bead.

The present invention provides an improved apparatus and method for producing the required outward expansion of the plies. Essentially it comprises forcing the plies outwardly by an inflatable bellows or diaphragm until the plies come into contact with an external supporting surface of predetermined size and shape. The method is both convenient and sure in operation and it produces the uniformity of cord spacing which is so essential to the successful performance of the air spring.

It is a general object of the invention therefore to provide an improved apparatus and method for manufacturing air springs. More particularly it is an object to provide an improved means for expanding fabric plies outwardly to form an air spring with ends of appreciably different diameters. Other objects are to expand the fabric plies of an air spring by inflating the plies outwardly into contact with a fixed supporting surface; and to provide an air spring having a uniformity of cord spacing.

These and further objects and advantages will be more fully apparent from the following description of a preferred form of invention, reference being had to the accompanying drawing in which:

FIGURE 1 is a somewhat diagrammatic view of an air spring manufactured according to the present invention shown mounted in the rear wheel suspension of an automobile.

FIGURE 2 is a diagrammatic representation showing the first stage of assembling an air spring on a cylindrical building drum.

FIGURE 3 is a longitudinal sectional view of an apparatus embodying the invention for expanding the air spring after it has been removed from the building drum of FIGURE 2.

FIGURE 4 is a view similar to FIGURE 3 showing the air spring expanded outwardly into contact with a supporting form.

FIGURE 5 is a somewhat diagrammatic view showing the expanded air spring of FIGURE 4 supported on a conical building drum for the completion of the building operation.

The invention will be described, by way of example, with reference to a single convolution, telescoping air spring, an air spring which is most useful in modern automobile wheel suspensions. Such an air spring which is indicated generally at 20 in FIGURE 1, preferably comprises a body 21 of two plies, 22 and 23, of rubberized fabrics, the fabric being essentially weftless and having cords which extend at an angle of about 15° to the axis of the air spring with the cords of one ply crossing the cords of the other. The interior of the air spring has an air-retaining lining of rubber which is preferably neoprene because of its oil resistant properties. The ends of the plies 22 and 23 are wrapped about and anchored to a pair of circular steel wire rings 24 and 25 to form the small and large beads 26 and 27, respectively, of the air spring.

According to present invention, such an air spring is conveniently made by assembling the innerliner and body plies 22 and 23 upon a cylindrical building drum such as that indicated at 28 in FIGURE 2. Such a drum is similar in most respects to the collapsible building drums used in the manufacture of pneumatic tires, being different only in size and in minor details of design which form no part of this invention and which need not be described herein.

After the plies have been assembled on the drum 28 in the form of a cylindrical body the bead ring 24 is manually placed over the body, there being just sufficient clearance in diameters to permit this to be done, and the right end portions of the plies are turned around the bead ring to form the small bead 26. The air spring is then in the condition shown in FIGURE 2 and is ready for the operation which expands the left end portion of the plies outwardly into position to receive the large bead ring 25 and form the large bead 27.

The apparatus for expanding the plies comprises a substantially rigid supporting form 30 which, in the present example, is a frusto-conical shell terminating in a flanged end 31 at the top of the shell and flaring down and outwardly to a flanged end 32 of substantially greater diameter. The diameter of the small flanged end 31 is slightly smaller than the diameter of the small bead 26 so that the semi-finished air spring of FIGURE 2 can be dropped inside the supporting shell with the small bead 26 resting upon and supported by the flange 31 as shown in FIGURE 3. The fabric plies are expanded outwardly into contact with the inner surface of the shell 30 by an inflatable bladder 33 which is cylindrical in form and extends the full length of the supporting shell. The ends 34 and 35 of the bladder are clamped between pairs of end plates 36 and 37 which are in turn supported by a central hollow stud member 38 which also acts as a conduit for supplying air under pressure to the bladder, the air entering through a line 39 connected to a source of air under pressure (not shown) and entering the bladder through the slots 40 in the wall of the member 38.

When the air spring is removed from the drum of FIGURE 2, it is suspended with its bead 26 resting upon the flanged end 31 with the bladder 33 as shown. Air under a pressure of about 10–20 pounds per square inch is then introduced into the bladder to inflate it and to thereby force the air spring body outwardly into contact with the shell.

The surface of the bladder is usually lubricated with a suitable material such as soapstone to enable the air spring body to slide readily upon the bladder as the expansion takes place. This helps to insure a uniform application of force to the air spring and helps insure a uniform spacing of the cords in the expanding air spring.

The expanded air spring body is allowed to remain in contact with the shell 30 for a moment or two so that it will have a chance to "set" in the expanded condition. The air pressure in the bladder is then relieved, and the expanded air spring is removed from the shell and promptly fitted upon a conical drum 42 such as that shown diagrammatically in FIGURE 5.

This second drum is similar in construction to the drum 28 of FIGURE 2 except it is conical in form. The large bead ring 25 is then slipped over the small end of the drum up over the air spring body until it is positioned near the left edge of the air spring and the expanded edge portions of the plies are then wrapped about the bead ring to form the large bead 27. The air spring is then removed from the drum 42 ready for the molding operation. The molding operation itself forms no part of this invention, it being sufficient to note that the air spring is simultaneously collapsed axially and expanded outwardly in a radial direction into contact with a multi-part mold which when closed defines a molding cavity which will form the air spring into its final shape of FIGURE 1.

This method of building an air spring is at once simple and effective; the apparatus involved is sure in operation and a uniform product of high quality is obtained. However, various modifications and variations will no doubt occur to those skilled in the art without departing from the scope of the invention the essential features of which are summarized in the appended claim.

I claim:

The method of forming an air spring prior to molding, comprising (a) assembling a plurality of rubberized fabric plies to form a cylindrical body, (b) forming a first inextensible bead of substantially the same diameter as said body at one end thereof, (c) flaring the other end of said body radially outwardly into contact with an external supporting surface, (d) supporting said flared body internally, and (e) forming a second bead at said flared end.

References Cited in the file of this patent

UNITED STATES PATENTS

| | | |
|---|---|---|
| 1,500,700 | Blaker | July 8, 1924 |
| 1,600,693 | Minor | Sept. 21, 1926 |
| 1,929,535 | Parker | Oct. 10, 1933 |
| 2,065,943 | Lerch et al. | Dec. 29, 1936 |
| 2,178,953 | Chilton | Nov. 7, 1939 |
| 2,221,470 | Brown | Nov. 12, 1940 |
| 2,265,346 | Brown et al. | Dec. 9, 1941 |
| 2,363,107 | Young | Nov. 21, 1944 |
| 2,460,820 | Hagopian | Feb. 8, 1949 |
| 2,614,952 | Kraft | Oct. 21, 1952 |
| 2,696,184 | Demarest | Dec. 7, 1954 |
| 2,710,026 | Stewart et al. | June 7, 1955 |
| 2,717,849 | Rempel et al. | Sept. 13, 1955 |
| 2,874,458 | Smith | Feb. 24, 1959 |
| 2,929,435 | Hollis | Mar. 22, 1960 |
| 2,955,325 | Davis | Oct. 11, 1960 |